F. L. SESSIONS.
CONTROLLER FOR ELECTRICAL APPARATUS.
APPLICATION FILED JAN. 9, 1904. RENEWED FEB. 17, 1911.
1,004,089.  Patented Sept. 26, 1911.
3 SHEETS—SHEET 1.
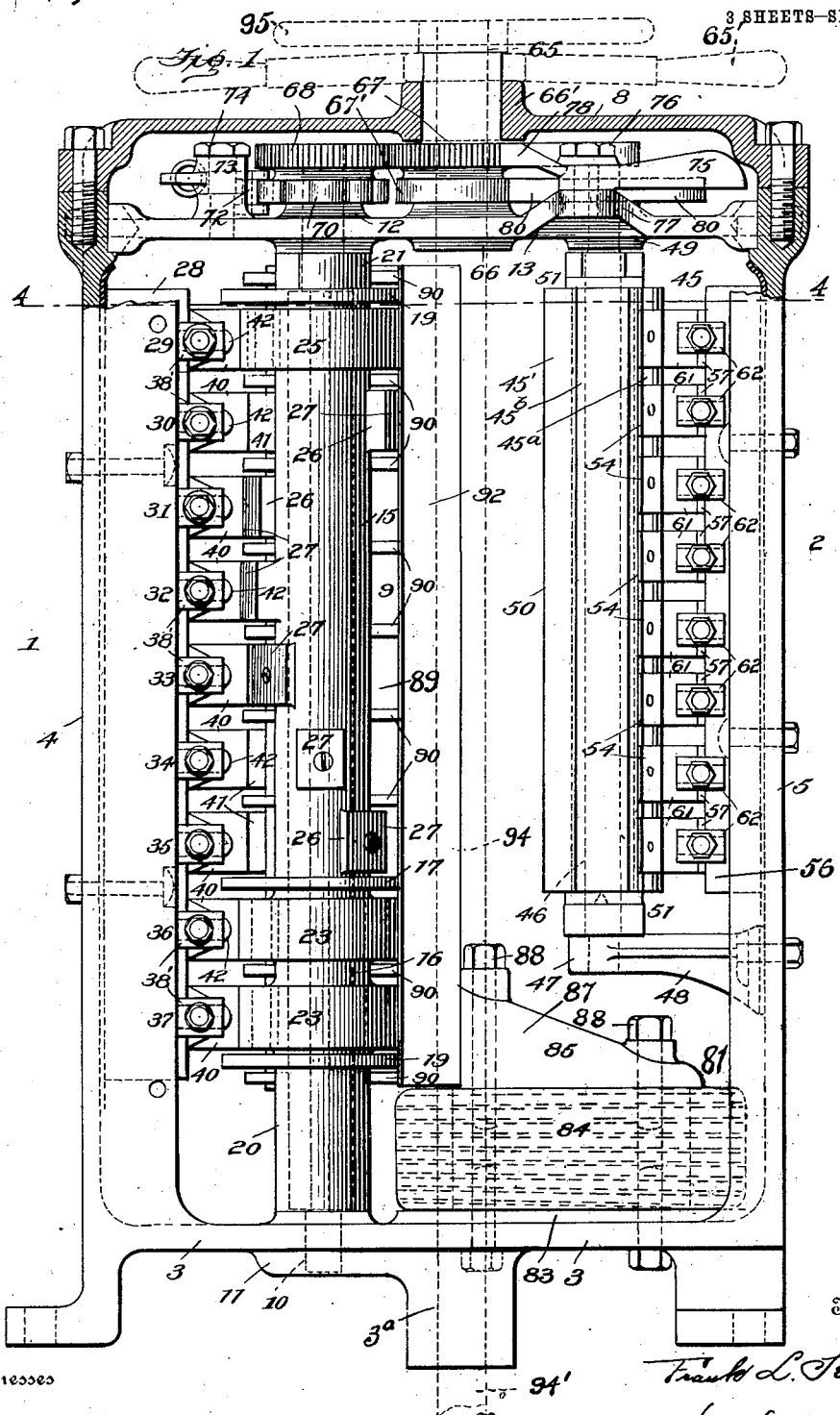

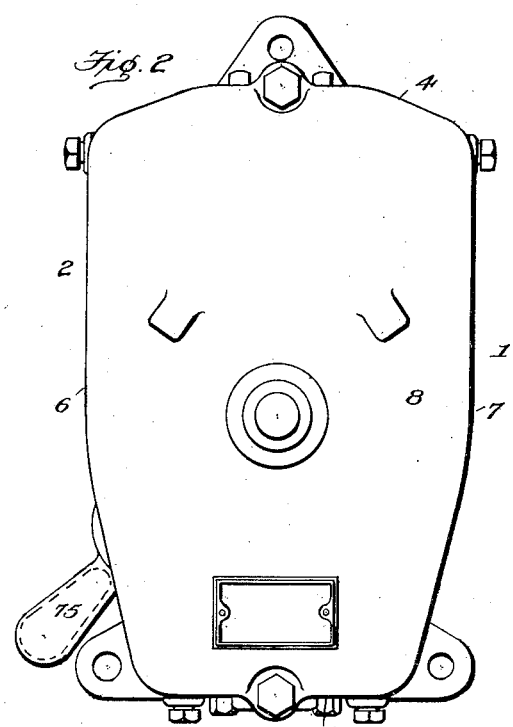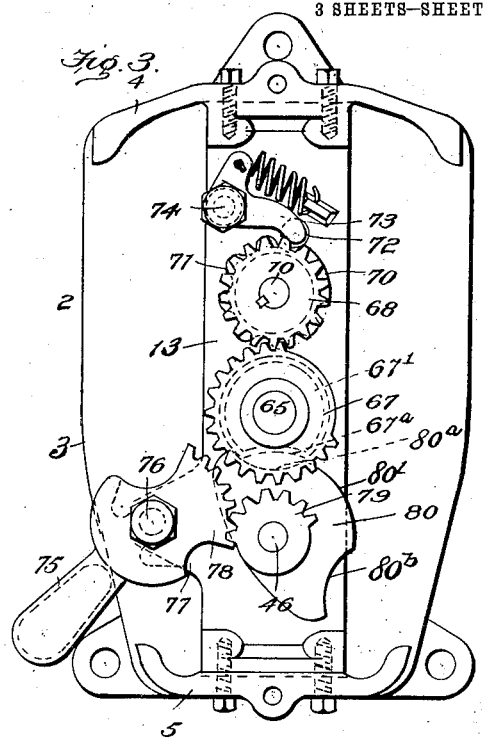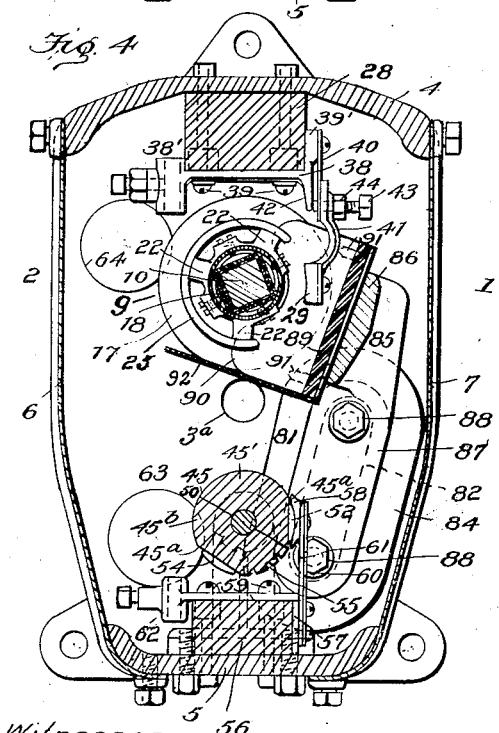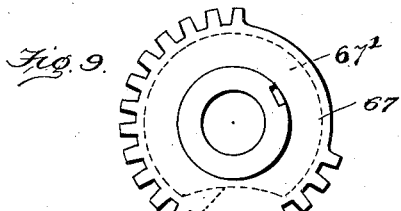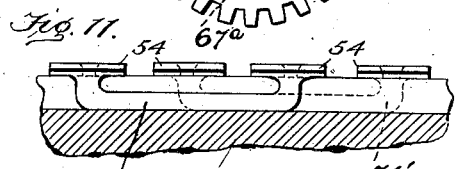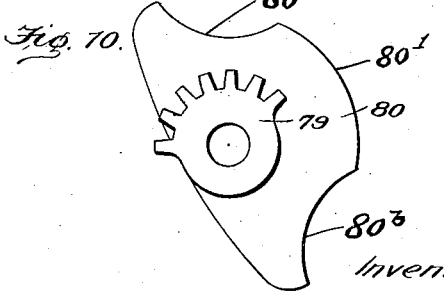

F. L. SESSIONS.
CONTROLLER FOR ELECTRICAL APPARATUS.
APPLICATION FILED JAN. 9, 1904. RENEWED FEB. 17, 1911.
1,004,089.
Patented Sept. 26, 1911.
3 SHEETS—SHEET 3.
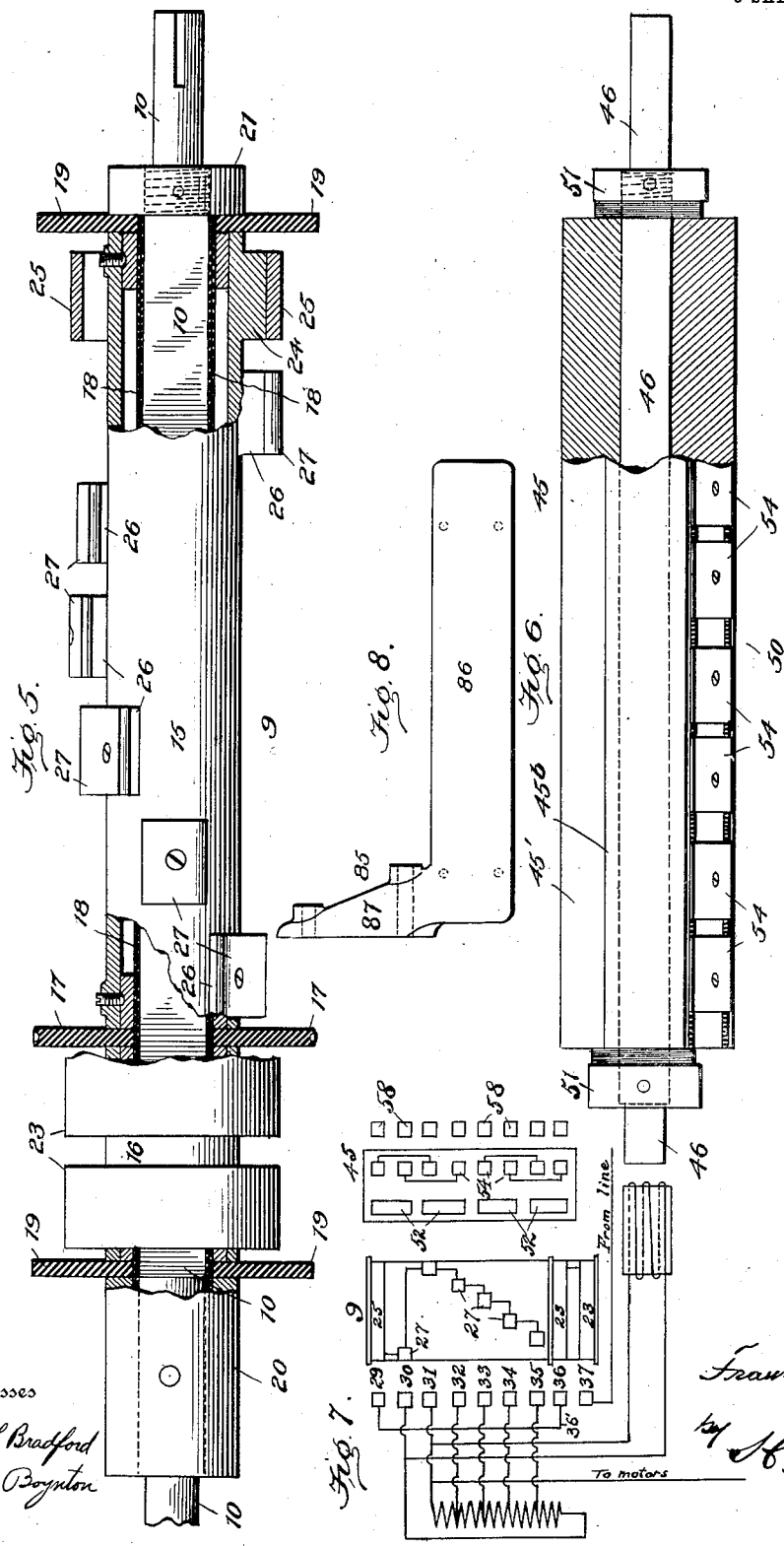

UNITED STATES PATENT OFFICE.

FRANK L. SESSIONS, OF COLUMBUS, OHIO, ASSIGNOR, BY MESNE ASSIGNMENTS, TO THE JEFFREY MANUFACTURING COMPANY, A CORPORATION OF OHIO.

CONTROLLER FOR ELECTRICAL APPARATUS.

1,004,089. Specification of Letters Patent. Patented Sept. 26, 1911.

Application filed January 9, 1904, Serial No. 188,351. Renewed February 17, 1911. Serial No. 609,213.

*To all whom it may concern:*

Be it known that I, FRANK L. SESSIONS, a citizen of the United States, residing at Columbus, in the county of Franklin and State of Ohio, have invented certain new and useful Improvements in Controllers for Electrical Apparatus, of which the following is a specification, reference being had therein to the accompanying drawing.

This invention relates to current switching and resistance controlling mechanism for motors and other electrical translating devices.

In the drawings: Figure 1 represents a sectional view through the controller mechanism. Fig. 2 is a top plan view of the same. Fig. 3 is a view looking into the controller box, the cover and side plates being removed. Fig. 4 is a section on the line 4—4, Fig. 1, adapted to show the gearing for operating the switches. Fig. 5 is a view partly in section of the controller switch. Fig. 6 is a view partly in section of the reverse switch. Fig. 7 is a diagram of the wiring of the controller mechanism. Figs. 8 to 11 show details.

In the drawings 1 represents the box for the controlling mechanism as an entirety. 2 indicates the frame of the box which is preferably formed of a metal of high magnetic permeability. This frame 2 has the bottom wall 3 and the end walls 4 and 5. The side walls 6, 7 of the box may be secured to the flanges on the said walls 4 and 5. These side walls may be made of sheet metal or similar suitable material.

8 indicates the cover for the controller which is detachably secured to the end walls 4 and 5 of the box frame 2.

Arranged within the box and at one end thereof is the controller switch which is indicated as an entirety by 9. 10 is the operating shaft for the said controlling switch mounted at its lower end in the bearing 11 in the bottom wall 3 and in its upper end in a bearing 12 carried by the transverse bearing plate 13 which is secured in position between the end walls 4, 5 near the top of the box frame 3. 15 is a commutating cylinder for the controller switch 9 arranged longitudinally of the controller box and incasing the said shaft 10 for a considerable portion of its length between its bearings. 16 is a commutating cylinder arranged on said shaft 10 beneath the commutating cylinder 15 and is relatively considerably shorter in length than the upper commutating cylinder. These commutating cylinders are insulated from each other by the insulating disk 17, and are insulated from the shaft 10 by suitable insulating material 18. The shaft 10 is square for the greater part of its length and the commutating cylinders 15 and 16 are so secured on the said shaft or on the insulating shell or casing thereon as to be rotated when the shaft is rotated. 19 are insulating disks arranged on the said operating shaft 10 at the opposite ends of the commutating cylinders 15, 16 and insulate these cylinders respectively, the lower one from the supporting sleeve 20, arranged between the lower cylinder 16 and the bottom wall 3, and the upper cylinder 15 from the binding nut 21 on the shaft 10 which is adapted to clamp the commutating cylinders and their insulating disks together.

22 are lugs or projections on the short commutating cylinder 16. They are arranged in two parallel rows and are positioned opposite to each other in these rows. 23 are commutator segments secured to the said rows of lugs or projections 22. These commutator segments 23 are of equal peripheral length and are similarly secured on their commutating cylinder relative to the axis of the shaft 10.

24 are lugs or projections on the upper end of the commutating cylinder 15. They are arranged in a row parallel to the rows of projections 22 on the commutating cylinder 16. 25 is a commutator segment secured to the said lugs 24. It is equal in peripheral length to the commutating segments 23 on the cylinder 16 and is similarly positioned relative to the axis of the shaft 10.

26 indicates a series of projections or lugs on the commutating cylinder 15 arranged in a series extending longitudinally of the cylinder and spirally around the periphery thereof. 27 are commutator segments secured to the said lugs or projections 26. These lugs or projections are so arranged on the commutating cylinder relative to each other as to successively bring their respective commutator segments into contact with their respective brushes which are held fixedly with respect to the said cylinder.

28 is an insulating plate secured to the end wall 4. The contact brushes for the commutator segments are secured to this plate, which serves to insulate them from the controller box. These brushes are indicated by 29, 30, 31, 32, 33, 34, 35, 36 and 37.

38 are brush holders which are rigidly secured by bolts 39 to the insulating block 28. 39' are outwardly extending arms on the brush holders 38. To these arms are secured the outer ends of the brush control springs 40. To the inner ends of the said control springs 40 the brush carriers 41 are secured.

42 are inwardly projecting arms on the brush holders, and 43 are adjusting screws carried by the brush holders 41, and adapted to engage with said arms 42 to adjust the position of the brushes relative to their respective commutator segments. 44 are locking nuts for securing the said adjusting screws in position when the brushes are adjusted.

38' are binding posts on the brush holders in which the electrical conductors leading to the brush holders are secured.

The devices for controlling the direction of rotation of the motors are arranged at the opposite end of the controller box from the controlling switch 9. This reversing mechanism or reverse switch is indicated as an entirety at 45. The controlling shaft 46 for the reverse switch is mounted at its lower end in a bearing 47 in the bearing arm 48 which projects inwardly from the end wall 5 and is rigidly secured thereto. The upper end of the shaft 46 is mounted in a bearing 49 carried by the bearing plate 13.

50 is a cylinder made of wood or other insulating material. It incases the shaft 46 for the greater part of its length between its bearing surfaces, and is secured to the said shaft by means of sleeves 51 engaging with the opposite ends of said reverse cylinder and themselves pinned or otherwise secured to the said shaft 46. The cylinder 50 is preferably formed in halves, as shown in the drawings. The periphery of the half 45' is plane surfaced at $45^a$ to receive the contact segments 52 which are arranged in series thereon. The other half $45^b$ of the cylinder 45 has two parallel longitudinal grooves adapted to receive the connecting bars 54' of the series of contact segments 54 which are secured to the said half of the reverse cylinder along the plane surface $45^a$ thereof.

55 indicate longitudinal saw slots in the periphery of the cylinder 50 which break the continuity of the cylindrical surface and prevent the formation of continuous metallic streaks between the contact segments 52 and 54 when the cylinder is rotated under brushes 58.

56 is an insulating plate or bar arranged longitudinally of the controller box and rigidly secured to the end wall 5 thereof. This plate or box serves as insulating support for the stationary contacts or brushes for the contact segments on the reverse switch.

57 are the brush holders for the series of brushes 58 which are adapted to electrically contact with the contact segments on the cylinder 45. These brush holders are rigidly secured by screws 59 to the insulating block 56.

60 are control springs secured at their outer ends to the brush holders and carrying at their inner ends the brushes 58.

61 are flexible conductors made of copper or other material which is a good conductor of electricity and are arranged between the brushes, the brush holders and their respective springs 60 so as to insure a good electrical contact between the brushes and their holders.

62 are binding posts on the brush holders.

63 is an aperture in the bottom wall 3 of the controller box through which the electrical conductors may be inserted into the box in the region of the binding posts 62.

64 is an aperture through the bottom wall 3 of the box through which the electrical conductors may be inserted into the box in the region of the binding posts 38'.

65 is a hollow shaft or sleeve through which power may be applied for operating the controller switch shaft 10. It is mounted at its lower end in a bearing 66 carried by the bearing frame 13, and in its upper end in a bearing 66' in the cover 8.

67 is a segmental gear secured to the shaft 65 and adapted to mesh with a gear 68 secured to the upper end of the shaft 10. Any desired style of hand lever or hand wheel may be secured to the shaft 65 for operating it.

67' is a plate or disk arranged beneath the gear 67 and preferably formed integral therewith being cut away or notched as indicated at $67^a$ for a purpose to be hereinafter described.

70 is a disk secured to the shaft 10 beneath the gear 68. The periphery of this disk is notched as indicated at 71. 72 is an anti-friction roller adapted to engage with the periphery of said disk and to be normally held in such engagement by means of a spring controlled bell-crank lever 73 which is pivoted to the bearing plate 13 at 74. The notches in the disk correspond in number with the number of different adjustments of resistance which the controller switch is capable of making plus one. This mechanism affords sufficient resistance to the turning of the shaft 10 to enable the operator to tell when he has turned the controller switch sufficiently to bring any one of its commutating segments into contact with its respective brush.

75 is the operating lever for the reverse switch. It is pivoted at 76 to the arm 77 on the bearing plate 13.

78 is the segment of a gear carried by the lever 75 at its inner end. It meshes with the gear segment 79 secured to the shaft 46. The segmental gear 79 has secured to its under face or formed integral therewith a locking plate 80, the purpose of which is to be hereinafter described.

81 indicates as an entirety the blow-out magnet for the current switching and resistance controlling switch. This blow-out magnet comprises the metallic core 82 which is rigidly secured to a boss 83 on the bottom wall 3 of the controller frame. The energizing coil 84 is arranged about the said core 82.

85 is a pole piece having the long arm 86 extending longitudinally of the commutating cylinders and the short arm 87 projecting at substantially right angles to said long arm and being rigidly secured by bolts 88, 88 to the top of the magnet core 82. While this pole piece may be constructed in any suitable manner so as to cause a magnetic field to be set up about the series of stationary contacts or brushes of the current switching and resistance controlling mechanism, I prefer to construct it as illustrated in the drawings.

89 is an insulating strip arranged along the inner surface of the long arm 86 of the pole piece.

90 indicate insulating plates or separators arranged at right angles to the insulating piece 89 and situated so as to extend inwardly for some distance on either side of each of the stationary contact members or brushes. These separating pieces 90 are secured by means of screws 91 to the insulating strip 89. They form together with the insulating piece 89 separate and independent chambers in which the contact segments on the commutating cylinder operate.

92 is an insulating plate arranged at substantially right angles to the insulating plate 89 and secured to the under edges of the insulating plates 90. It is adapted to prevent the arcs occurring at the brushes from jumping across the interior of the casing and injuring the reverse switch 45 and also from burning the break shaft to be hereafter described which may extend through the casing.

The lines of force in the magnetic field set up when the current flows through the energizing coils 84 of the blow-out magnet travel through the respective chambers in which the commutating segments operate find their return circuits through the shaft 10 and the walls of the controller box to the magnet core. The lines of force of said magnetic field in each of said chambers tend, in the well known manner, to blow out the arc which occurs between the stationary brush and its commutating segment therein when contact is broken between them. As indicated in the diagram of the wiring connection for the controller shown in Fig. 7, the energizing coil of the blow-out magnet 81 is connected in parallel with the resistance which is controlled by the switch 9. This insures that the coil will be effective in all positions of adjustment of the said controlling switch 9, and most effective at the instant the final interruption of current occurs. This final break of the current occurs at the pairs of brushes 29—30 and 36—37 arranged at the opposite ends of the switching cylinder. The arcing due to the final interruption of the current is thus caused to take place at four different points and the severity of the arcing is thereby distributed over quite a large surface, so that no one brush is subjected to the highly detrimental effect which would be caused if the final break was to occur between it and its commutator segment alone. The current enters the controller mechanism through the brush 37 and is conducted by the commutator segments 23 and the commutating cylinder 16 to the brush 36.

36' is a conductor electrically connecting the brush 36 with the brush 29 which directs the current to the commutator segment 25 at the upper end of the commutating cylinder 15. This cylinder conducts the current to the series of short commutator segments arranged thereupon over which it is switched through the varying resistances as these commutator segments come into contact with their respective brushes.

As above mentioned, the gears 67 and 79 are provided with the plates 67' and 80 respectively. These plates constitute an interlocking device between the current controlling switch and the reverse switch. The plate 80 is provided with two notches 80$^a$ and 80$^b$ with which the periphery of the plate 67' is adapted to coöperate so that when the gear 67 is turned from its "off" position so as to close the electrical circuit through the controller, it is impossible to turn the reverse switch 45 as the walls of the notches in the plate 80 will at once engage with the periphery of the plate 67'. When the plate 67' is turned into the "off" position or the circuit controlled by the mechanism is open, the notch 67$^a$ is so situated relatively to the periphery 80' of the plate 80 between its notched portions 80$^a$ and 80$^b$ that the said plate may be turned so as to turn the reverse switch and reverse the direction of the current to the motors, in which turned position the notched portion 80$^b$ of the said plate is so positioned relative to the plate 67' as to permit the turning of the current switching shaft 65. And it will be seen that when the periphery of the plate 67' enters the notch 80^b, that it will be impossible to change the direction of the current to the motors without first turning the controlling shaft 65 to its "off" position.

Where the economy of space is a necessary incidence to the success of a controller mechanism, as in the case of mine locomotives, I find it very advantageous to arrange the axis of the brake shaft for braking the travel of the locomotive co-incident with the axis of the hollow shaft 65. This arrangement of the brake shaft I have indicated in dotted lines in Fig. 1. 94 indicates the brake shaft mounted at its upper end in the hollow shaft 65 and at its lower end in the bearing 3^a carried by the bottom wall 3 of the controller frame. 65' indicates the lever or handle for operating the current switch 9 and 95 indicates the brake wheel arranged above the said handle and rigidly secured to the shaft 94. The lower end 94' of the brake shaft may be connected in any suitable way to any suitable form of brake mechanism on the locomotive.

The contact segments of one of the series on the reverse switch 45 are so connected with each other, as indicated in Fig. 7, that when its movable segments are in contact with the brushes 58, the current will be conducted to the motors in such direction as to cause the locomotive to move forward; while the contacts in the second series on said reverse switch are so connected together, that when they are in contact with the brushes 58 the current will be conducted to the motors so as to cause the locomotive to move backward.

What I claim is:

1. In a controller for electrical apparatus, the combination with the resistance, of a series of stationary contacts connected therewith, a series of movable contacts for engaging with said stationary contacts successively and a blow-out magnet having a pole piece arranged adjacent to the said series of stationary contacts and having its energizing coil connected in parallel with the said resistance, substantially as set forth.

2. In a controller for electrical apparatus, a current switching and resistance controlling mechanism comprising a series of stationary contacts and a switching cylinder formed with an upper and a lower section insulated from each other and each section provided with commutator segments adapted to engage with the brushes of the said stationary series and so arranged on said sections that the final break when current is cut out from the resistance will occur between the pairs of contact segments and their brushes at either end of said switching cylinder, substantially as set forth.

3. In a controller for electrical apparatus, the combination of the series of stationary contacts, the series of movable contacts, the blow-out magnet having its core arranged at one end of said series of stationary contacts, and the L shaped pole piece, having its short arm detachably connected to said core and its long arm extending longitudinally of said series of contacts.

4. In a controller for electrical apparatus, a switching cylinder having a pair of contact segments at one end thereof and insulated from a pair of contact segments at the opposite end thereof of equal peripheral length and similarly placed on the said cylinder and the intermediate contact segments arranged on said cylinder so as to contact successively with their respective brushes, substantially as set forth.

5. A switch for an electrical controller having a cylinder formed of insulating material with rows of contact segments thereon, the cylinder being longitudinally grooved between the said rows of contacts, substantially as set forth.

6. In a controller for electrical apparatus, the combination with a series of stationary contacts, of a cylinder having a series of contact elements adapted to engage with said stationary contact elements respectively, two pair of said contact elements on said cylinder being insulated from each other and adapted to have the final break of the circuit occur between each of them and their respective stationary contacts.

7. In a controller for electrical apparatus, a current-switching and resistance controlling mechanism comprising a series of stationary contacts and a switching cylinder formed with an upper and a lower section insulated from each other and each section provided with commutator segments adapted to engage with said stationary contacts, the said stationary contacts being connected into the electrical circuit in such manner as to cause both the making and breaking of the circuit when the switching cylinder is operated between commutator segments arranged near opposite ends of said cylinder and their respective brushes.

8. In a controller for electrical apparatus, the combination of a casing having side, bottom and top walls, a bearing plate secured within said casing adjacent to said top wall, a hollow shaft mounted on said bearing plate and extending through said top wall, a brake shaft extending at its upper end through said hollow shaft and extending through a bearing in the bottom wall of said casing, a switching cylinder arranged parallel with and at one side of said brake shaft within the said casing, power transmitting devices interposed between said cylinder and said hollow shaft, hand operated means for rotating said hollow shaft, and hand operated means for operating said brake shaft.

9. In a controller for electrical apparatus, the combination of a casing having side, bottom and top walls, a bearing plate secured within said casing adjacent to said top wall, a current-switching cylinder mounted within said casing between said bearing plate and said bottom wall, an operating shaft for said cylinder connected thereto and extending through said top wall, a current-reversing mechanism mounted within said casing, interlocking mechanism interposed between said operating shaft and said reversing mechanism comprising a pair of plates, one secured to the said shaft and the other pivotally mounted on said bearing plate and connected to said reversing mechanism, each of said plates having a notched portion adapted to receive the periphery of the other plate when the mechanism connected to the latter is being operated, a gear rigidly secured to the second described plate, a gear meshing with said first described gear and pivotally mounted on said bearing plate between it and the top wall of the casing, and an operating handle connected to the last described gear.

10. In a controller for electrical apparatus, the combination of a current switching and resistance controlling mechanism, the resistance controlled thereby, a blow-out magnet and current conducting connections between the current supply, and the said resistance, and the energizing coil of the blow-out magnet arranged to render the latter most strongly energized the instant of the final interruption of the current through the resistance, substantially as set forth.

In testimony whereof I affix my signature in presence of two witnesses.

FRANK L. SESSIONS.

Witnesses:
  W. B. MATHO,
  J. P. PINNEY.